United States Patent [19]

Shaftner et al.

[11] 4,443,187

[45] Apr. 17, 1984

[54] PORTABLE HEATER WITH INTEGRATED CONTROL SYSTEM

[75] Inventors: Robert S. Shaftner; Norman D. Chambers; Michael A. Kagan; Eugene C. Briggs, all of Bowling Green, Ky.

[73] Assignee: Koehring Company, Brookfield, Wis.

[21] Appl. No.: 384,868

[22] Filed: Jun. 4, 1982

[51] Int. Cl.³ ............................ F24H 1/00; H01B 7/34

[52] U.S. Cl. ................................ 432/222; 126/110 B; 174/16 R; 357/82; 361/384

[58] Field of Search ..................... 432/222; 126/110 R, 126/110 B, 110 C, 110 D; 174/16 R, 16 B, 16 BH, 16 HS, 15 R, 15 C; 357/82, 84; 361/383, 384, 389, 399

[56] References Cited

U.S. PATENT DOCUMENTS

| | | | |
|---|---|---|---|
| 3,114,538 | 12/1963 | Kennedy | 432/222 |
| 3,407,869 | 10/1968 | Staunton | 174/16 R |
| 3,623,546 | 11/1971 | Banthin | 361/383 |
| 3,771,293 | 11/1973 | Vest | 174/16 R |
| 3,822,990 | 7/1974 | Henson | 432/222 |
| 4,027,205 | 5/1977 | Frederick | 361/384 |
| 4,027,642 | 6/1977 | Kamada | 432/222 |
| 4,050,093 | 9/1977 | Crall | 361/383 |
| 4,053,279 | 10/1977 | Eichenlaub | 432/222 |
| 4,081,238 | 3/1978 | Briggs | 432/222 |
| 4,103,737 | 8/1978 | Perkins | 361/384 |
| 4,236,055 | 11/1980 | Kaminaka | 361/384 |
| 4,244,349 | 1/1981 | Velie | 126/110 C |
| 4,313,417 | 2/1982 | Briggs | 126/110 B |

*Primary Examiner*—Daniel J. O'Connor
*Attorney, Agent, or Firm*—Jerome P. Bloom

[57] ABSTRACT

A heater including a generally cylindrical shell defining its housing arranged in a very closely spaced relation to the outer periphery of its combustion chamber assembly and its fan device as it bounds a plenum chamber therebetween. The combustion chamber assembly has its discharge end adjacent the discharge end of the shell. The relative configuration of the outer peripheral surface of the combustion chamber assembly and that of the discharge end portion of the shell creates therebetween a passage through which the fan device, on energization thereof, produces a very high velocity flow of a thin layer of air which, on discharge, is throttled and abruptly and sharply driven into the center of the flow from the assembly. The effect of this is to moderate and influence a relative uniformity of the temperature of the discharge and rapidly project it outwardly of and considerably beyond the heater. A further consequence is the creation of such a head of pressure in the plenum chamber as to produce a greater and more uniform pressured flow of air into and about the combustion chamber. The whole provides a heater which for a given size has a heating capacity substantially greater than heretofore. The heater also features an integrated control system giving it an uncluttered interior and insuring, to a significant degree, against failure and malfunction. A preferred housing for the heater is a multi-part shell the form of which eliminates need for intervening gaskets.

13 Claims, 8 Drawing Figures

PORTABLE HEATER WITH INTEGRATED CONTROL SYSTEM

BACKGROUND OF THE INVENTION

This invention relates to improvements in portable space heaters and components thereof which simplify their assembly, improve their operation, efficiency and safety in use and render them easier to service and maintain. Its features are most advantageous in application to oil burning space heaters and will be described in this context. However, this is only for purpose of illustration and not by way of limitation, either as to their application or the form of their embodiment.

The invention embodiments are characterized by one or more of the following features:

a. A construction providing them with an improved pattern of air flow which, for a given size heater, significantly increases its heating capacity and thermal output;
b. An improved integral control system and placement thereof relative to the heater air flow which minimizes the possibility of electrical component and system failures due to contamination or vibration;
c. An isolation of the integrated control system from the heat of combustion and the insulation thereof by the coolest portion of the air flow through the heater;
d. A very simply and economically fabricated two part shell providing a heater housing the configuration and placement of which with respect to its combustion chamber assembly not only contributes to a much improved performance but a construction of a heater enabling the assembly of its parts without need for intervening gaskets;
e. A heater construction which is uncluttered providing easy access to all of its parts, which can be serviced, maintained and safely operated by unskilled persons;
f. A heater the construction and arrangement of which enables a quicker, more uniform and wider spread of its developed heat than heretofore possible.

The features of the present invention enable a portable oil burning space heater which as compared to the prior art is, for its size, more effective in its operation and more reliable and safer in use. At the same time an embodiment of the invention provides a heater which is easy to service and maintain by relatively inexperienced and unskilled persons, thereby giving the heater a longer and more satisfactory operating life.

All the foregoing are answers to needs and problems which have been evidenced in the manufacture and use of prior art heaters.

The inventors are not aware of any prior art which is specifically pertinent to the particular features of construction which represent the improvements of the present invention. However, for the most pertinent prior art as to the basic composition of a heater of the type to which the invention is applied, reference is made to U.S. Pat. Nos. 4,082,642 and 4,313,417.

SUMMARY OF THE INVENTION

A heater per the present invention has a highly improved though simple construction. A preferred embodiment includes improvements which derive from the construction of the shell which defines the heater housing and its configuration and arrangement in a very closely spaced relation to the outer periphery of its combustion chamber assembly and its fan device as it bounds a plenum chamber therebetween. The operation of the fan device produces a relatively high velocity, substantially uniformly maintained flow of air into and about the combustion chamber as well as an even higher velocity thin layered flow of air peripheral to the discharge end of a portion of the combustion chamber assembly which is throttled and deflected on discharge to move directly into the discharge from the assembly in a manner to moderate and render more uniform the temperature of the discharge from the assembly and the combustion chamber thereof and to accelerate and more widely and safely spread the total discharge to a degree not heretofore possible using a prior art heater of the same type and size.

The benefits of the invention include the development of a pressure head in the plenum chamber of the heater the level and effect of which is to provide it with a significantly increased heating capacity.

A preferred heater shell per the invention is distinguished by its stepped cylindrical configuration and split construction the mating parts of which have integrated portions which define seals therebetween as they are secured together.

A further feature of the invention is the integration of a motor starting device, preferably a positive temperature coefficient resistor, the safety control circuit and the safety circuit breaker of the heater on one small section of insulating board which serves also as the terminal board for all heater connections. Per the preferred embodiment thereof, this integrated control system is attached to the exterior of the heater housing in proximity to the coolest portion of the flow of secondary air induced to move to and through the heater housing to its plenum chamber. The controls and circuitry embodied on the terminal board are in fact insulated by the flow through the heater housing in an area of its interior immediately of the motor and the interconnected transformer and fan. The arrangement is such that only minor wiring connections need extend between the board and to the ignition and flame sensing elements and other operating elements required by the heater. Resultingly the heater housing and its plenum chamber is uncluttered. As a consequence, in use of the heater there is not only an avoidance of interference with secondary air flow but a substantial reduction and a possible elimination of the incidence of electrical component failures such as occur in the use of heater wiring methods of the prior art when there is a contaminated air flow or from vibration induced by air flow.

The substitution of a posistor or positive temperature coefficient resistor for a relay in the starting and control circuit of a heater per the invention has the benefits thereof enhanced by its insulated location and integration as above described.

Other features of the invention will become self-evident from the following description of a preferred embodiment.

It is accordingly a primary object of the invention to provide portable space heaters which are economical and simple to fabricate, assemble and maintain, more efficient and satisfactory in use and embody features adaptable to a wide range of application.

A further object is to provide a construction of a portable heater with an improved air flow pattern increasing its heating capacity and rendering it capable of inducing a more effective spread of its developed heat which is caused to have a more uniformly controlled and safer level of temperature than heretofore found in the use of comparable heaters of the prior art.

Another object is to provide for an improved embodiment and disposition of the circuitry, wiring and essential controls in a portable space heater.

A further object is to provide a better and more reliable starting system for a heater.

An additional object is to provide portable space heaters which are safer to operate as well as one possessing advantageous features, heater parts and systems and the inherent meritorious characteristics such as herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawings which reveal some but not the only embodiments of the present invention, FIG. 1 is a perspective view of a heater per the present invention;

Like parts are indicated in similar characters of reference throughout the several views.

PREFERRED EMBODIMENT OF THE INVENTION

Figure 1:
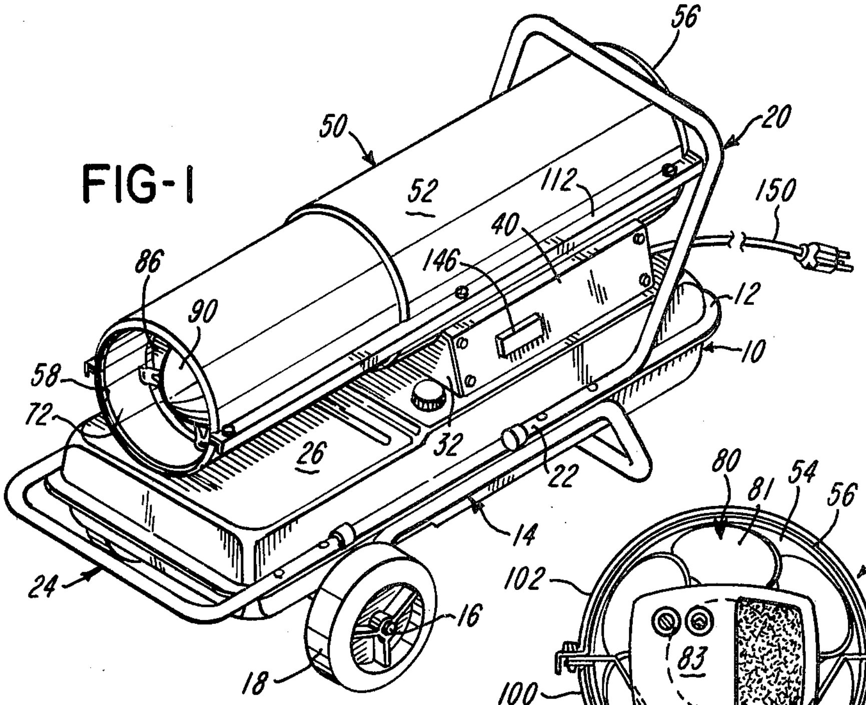
Figure 2:
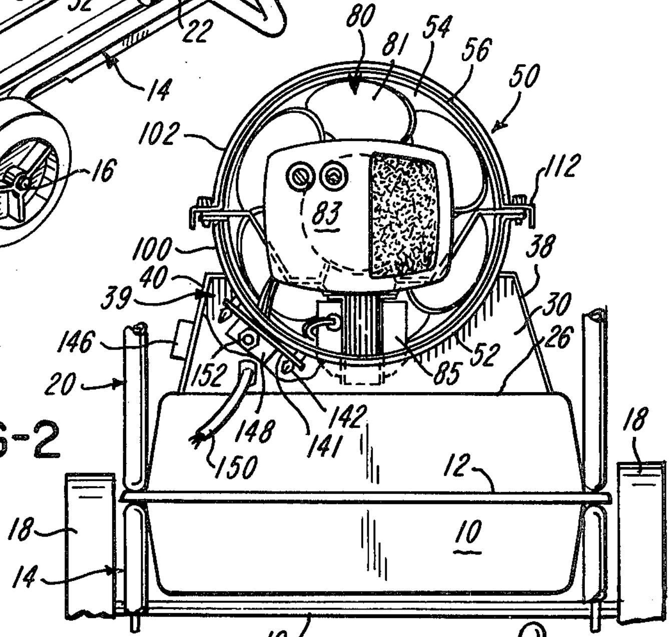
FIG. 2 is a view of its inlet end, with its fan guard removed.
Figure 3:
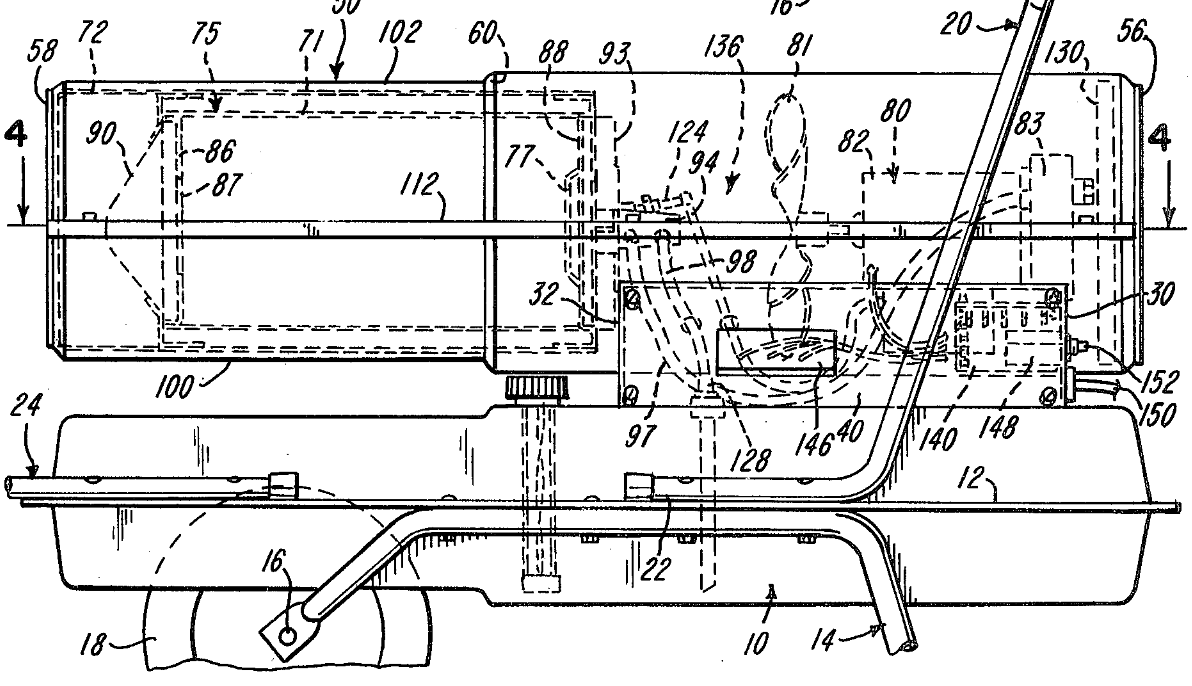
FIG. 3 is a side elevation view thereof.
Figure 4:
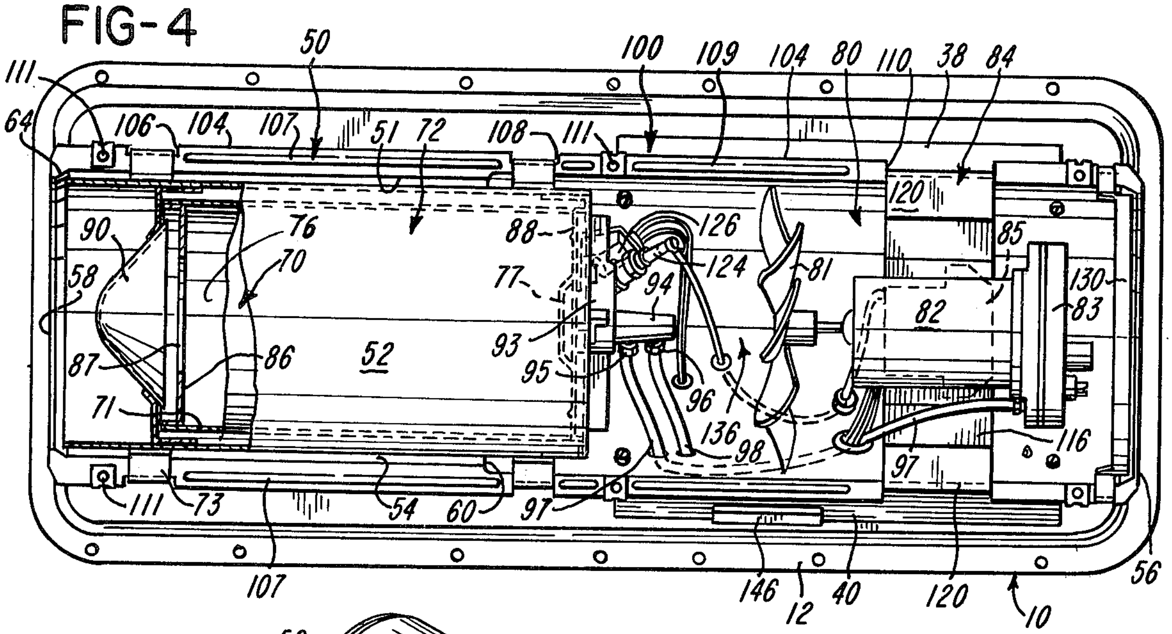
FIG. 4 is a top view thereof with the top half of its housing removed.
Figure 5:
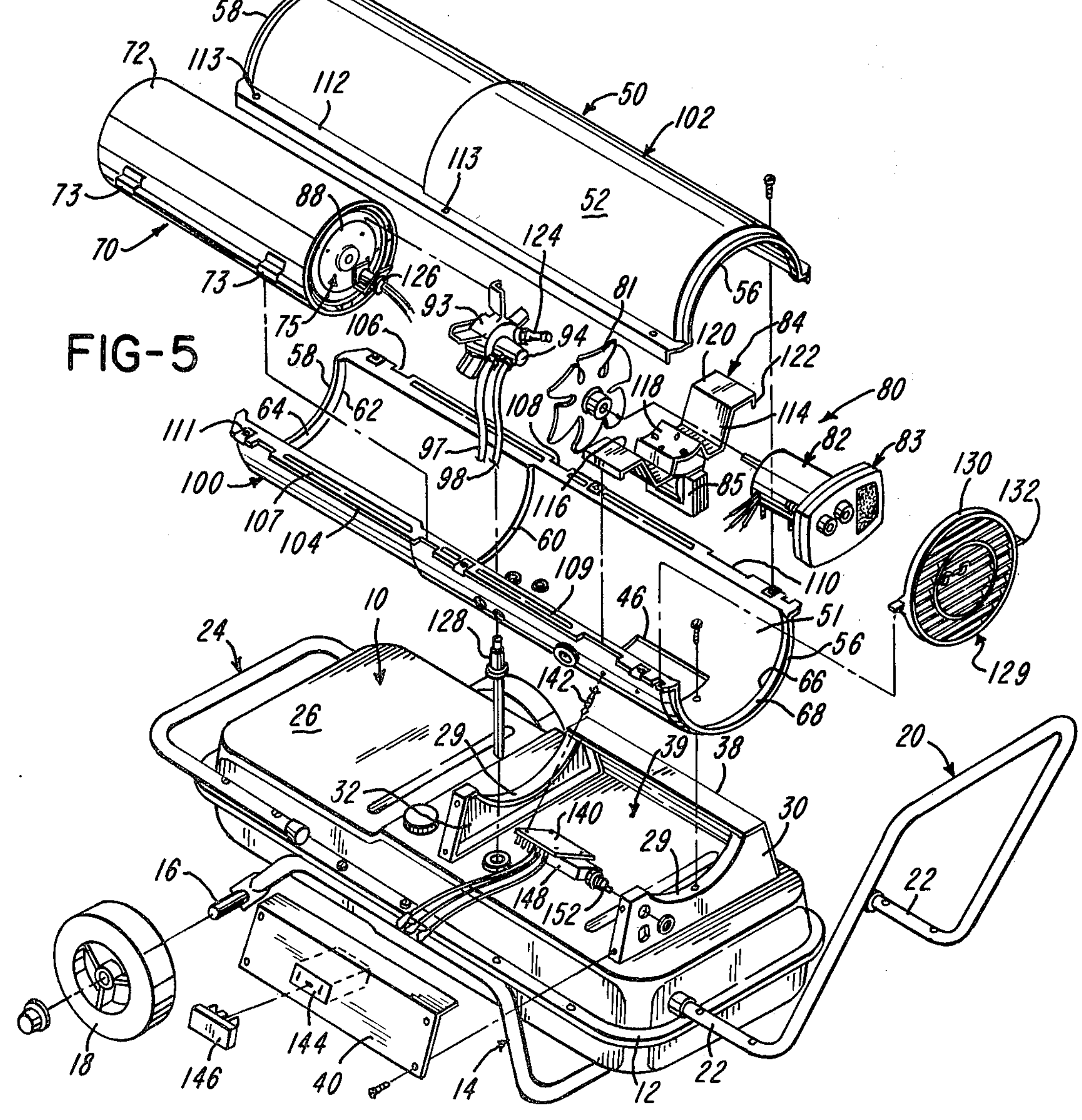
FIG. 5 is an exploded view of the heater.
Figure 6:
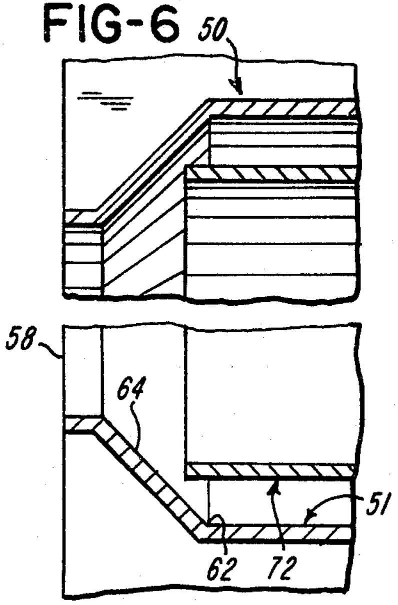
FIG. 6 is a fragmentary detail view, in cross section of the discharge end of the heater.
Figure 7:
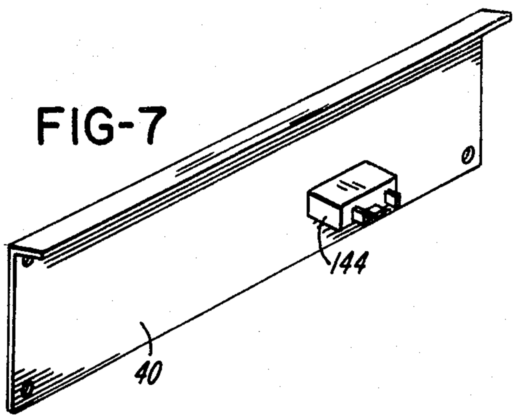
FIG. 7 is a perspective view of the releasable plate forming a side wall portion of the compartment housing the integrated control system of the invention.

Referring to the drawings, the portable space heater illustrated includes a shallow rectangular fuel tank 10 having an external flange 12 in a medial horizontal plane thereof. The tank 10, the length of which is substantially greater than its width, may be seated to a ground surface. However, in this case a U-shaped frame 14 has segments of its leg portions, intermediate its ends, fixed to the undersurface of the flange 12, at laterally aligned positions along opposite longitudinally extending sides of the tank. The respective end portions of the frame relatively diverge as they are bent downwardly from the flange 12. The base of the "U" seats to ground surface and the projected ends of the leg portions of the "U" are bridged by and connected to a shaft 16 the outwardly projected ends of which each mount for rotation thereon a wheel 18. The tank is thereby rendered mobile and mounted in spaced elevated relation to the underlying ground surface.

To assist in movement of the tank on the wheels 18, in a obvious manner, a second U-shaped frame element 20 has the projected extremities 22 of its legs fixed over the flange 12 at the respectively opposite longitudinally extending sides of the tank 10 while the remainder inclines upwardly and rearwardly therefrom to overlie that end portion of th frame 14 including the bridging portion of its U shape which seats to the ground surface. With this arrangement the bridging portion of the frame element 20 is substantially elevated over the top of the tank 10 and in an adjacent spaced relation to what may be considered the rear end of the tank. The opposite or front end of the tank 10 is bridged by a third U-shaped frame element 24 leg portions of which at their projected extremities are fixed to the upper surface of the flange 12 at the respective longitudinally extending sides of the tank while its bridging portion is projecting outwardly from the front end of the tank in spaced relation thereto. Frame 24 thereby provides a projected bumper.

A pair of peripherally flanged plates 30 and 32 are fixed perpendicular to and transversely of the upper surface 26 of the tank 10, in longitudinally spaced parallel relation, within the half of its length adjacent its rear end. Plate 30 is most adjacent the rear end while plate 32 is at a location adjacent the midpoint of the length of the tank. The flanges on the plates 30 and 32 are directly aligned as they project from their most adjacent faces. The upper edges of the plates 30 and 32 have identical depressions 29, centered with reference to their transversely extending length and relatively aligned. The depressions 29 are formed on a radius which is complementary to that of a portion of a length of a generally cylindrical tubular shell 50 forming the heater housing, a portion of the bottom of which seats on and is fastened to the upper flange portions of the plates 30 and 32 in the mount thereof in connected relation to the tank 10. The longitudinally spaced side edges of the plates 30 and 32, which respectively position adjacent the respective longitudinally extending sides of the top surface of the tank 10, are in each case also aligned. The side edges of the plates 30 and 32 at one side of the tank are bridged and have connected thereto a plate 38 the bottom edge of which seats to the top surface of the tank, the side edge portions of which overlap the flanges of the plates to which they are applied and a bent over flange at the upper extremity of which overlaps adjacent end portions of the flanges at the upper edge of the plates 30 and 32 to extend to and abut the heater housing. A plate 40 identical to the plate 38 is similarly applied to the side edges and flanges of the plates 30 and 32 at the side thereof opposite the plate 38. The plate 40 thereby completes a relatively closed compartment 39 the base of which is a portion of the upper surface of the tank 10, the transversely disposed longitudinally spaced sides of which are provided by the plates 30 and 32, the top of which is provided by a bottom portion of the housing 50 and bent over upper edge portions of the plates 38 and 40 and the longitudinally extending side portions of which are provided by the plates 38 and 40. The plate 40 is connected by quick release fasteners to provide ready access to the compartment 39. There is a single permanent rectangular opening 46 to the compartment 39, adjacent the plate 30, provided in that bottom portion of the housing 50 which forms the top of the compartment. By virtue of its mount to the plates 30 and 32 the housing 50 is established in a spaced elevated relation to the upper surface of the tank 10. Note should be made of the fact that the housing 50 has a length substantially corresponding to that of the tank 10, within its limits.

The heater housing 50 seated to the saddle provided by the plates 30 and 32 is a generally cylindrical tubular shell having a substantially uniform wall thickness and inner and outer wall surfaces 51 and 52 of complementary configuration. The surface 51 bounds a longitudinally extended passage 54 open to each of its opposite ends 56 and 58, which respectively define the inlet opening to and the discharge opening from the passage 54. The shell 50 has a slight radial offset at a point in its length more closely adjacent its discharge opening 58 than its inlet opening 56 producing in its inner surface a narrow annular shoulder 60 facing the inlet 56. A correspondingly opposite facing shoulder is formed thereby in the outer surface 52.

The diameter of the surface 51 is uniform from the shoulder 60 to a point 62 located in an immediately adjacent spaced relation to its discharge opening 58 and corresponds, substantially, to the diameter of the radially innermost limit of the shoulder 60. Beyond the point 62 the diameter of surface 51 is slightly and gradually reduced within the very short segment 64 of its length which has a conically convergent configuration and terminates in a narrow ring shaped lip defining the opening 58. The diameter of surface 51 is also substantially uniform from the shoulder 60 to a point 66 in its length located in an immediate adjacent spaced relation to its inlet 56, but here its diameter corresponds to that of the radially outermost limit of the shoulder 60. A very short segment 68 of the length of the surface 51 immediately following the point 66 is conically convergent and like the segment 64 terminates in a narrow ring-shaped lip defining the inlet opening 56. In the preferred embodiment illustrated about 60% of the length of passage 54 lies between the inlet 56 and the shoulder 60 and only about 40% of its length lies between the shoulder 60 and the discharge opening 58.

Shell 50 houses a combustion chamber assembly 70 therein adjacent its discharge opening 58. The assembly 70 has as its outer element a tubular heat shield 72 fixed, by radial spacers, in concentric spaced relation to the peripheral wall 71 of a hollow enclosure 75 defining a combustion chamber 76. The shield 72 has a uniform diameter and a length approaching one-half that of the passage 54. The outermost end of the shield 72 is located in a transverse plane of the shell 50 including the point 62 and its innermost end lies in a plane substantially parallel to and to the rear of the plane of the shoulder 60. Shell 50 also houses therein an assembly 80 adjacent to its inlet opening 56 which is aligned with and longitudinally spaced from the assembly 70. The assembly 80 comprises a fan 81 most adjacent the assembly 70, a motor 82 and a pump 83, all mounted to a strap-like saddle 84. A transformer 85 is fixed to depend from the bottom of the saddle 84.

The peripheral wall 71 of the enclosure 75 is defined by a tubular element bridged by a plate 88 inset from its innermost end which corresponds to the innermost end of the enclosure 75. The plate 88 has a central aperture rimmed by a flange projecting and converging inwardly of the combustion chamber 76 to define its inlet 77. To complete the enclosure 75, adjacent and slightly inward from its outermost or opposite end, the tubular element providing the wall 71 is bridged by a further plate 86 having a central opening 87 therein for discharge from the combustion chamber 76 which is in a coaxial alignment with the inlet 77. The opening 87 is in coaxial alignment with and communicates with an outwardly convergent cavity defined by a cone-shaped plate 90 the base peripheral edge of which is spaced slightly outward from the plate 86 and has a diameter somewhat greater than that of the opening 87. The outer periphery of the plate 90 adjacent its base edge includes a plurality of circumferentially and equidistantly spaced radially projected fingers the projected extremities of which are fixed to the inner surface of the shield 72 immediately beyond the outer end of the peripheral wall 71 of the combustion chamber 76. As so mounted the plate 90 essentially caps the discharge opening 87 to form with the central portion of the plate 86 an afterburner chamber for the heater and defining with the plate 86, slightly outward from the peripheral bounding edge of the aperture 87, an annular opening from the afterburner chamber which provides for the discharge from the combustion chamber to move from the afterburner in a sense laterally, to the space immediately about the nose cone provided by the plate 90 within the short outermost end portion of the wall 71. Air heated in the process of combustion in the chamber 76 will thus issue from the afterburner in a manner to produce a swirling flow thereof about and over the nose cone provided by the conical plate 90 to exit in a swirling fashion through the relatively projected end portion of the heat shield, in the process of which it will be entrained by and intermingled with a relatively tubular layer of air directed through and discharging from the space between the heat shield 72 and the wall 71, to be affected thereby in a manner to be further described.

A burner head 93 fixed in connection with the plate 88 mounts and exposes the discharge end of an aspirating type atomizing nozzle assembly 94 to the combustion chamber 76 by way of its inlet opening 77. The assembly 94 is of conventional nature and has in connection therewith adapters 95 and 96 for the respective connection thereto of a line 97 providing for the delivery of air to the nozzle, under pressure, and a line 98 for the delivery of fuel, under the influence of the air directed to and through the nozzle by way of the adapter 95.

In the preferred embodiment illustrated the shell 50 is a diametrically split structure comprised of two longitudinally extending separate portions each of generally hemicylindrical configuration and respectively providing a lower portion 100 and an upper portion 102 of the heater housing. The diametrically opposite edges of the lower portion 100, the bottom of which is fixed to the saddle provided by the plates 30 and 32, is provided with outwardly directed co-planar flanges 104. Each flange 104 is provided with a series of three longitudinally spaced, generally rectangular notches 106, 108 and 110, the notches 106 being in adjacent spaced relation to that end of the part 100 forming, in part, the discharge opening 58 and the notches 110 being in an adjacent spaced relation to the inlet opening 56. The notches 108 are located between and in a substantially equidistantly spaced relation to the notches 106 and 108, in a transverse location of the shell 50 spaced immediately to the rear of the plane of the shoulder 60. The notches are thereby provided in transversely aligned pairs.

A portion of the length of each flange 104 extending from immediately adjacent the notch 106 to immediately adjacent the notch 108 is offset to form on its uppermost surface a longitudinally extending rib 107. A similarly formed rib 109, aligned with the rib 107 extends longitudinally of the upper surface of each flange 104 from immediately adjacent its notch 108 to immediately adjacent the notch 110. The rib 109, however, in each case, is interrupted intermediate its length, adjacent the notch 108, by an aperture 111. Additional apertures 111 are provided in each flange adjacent its respective ends. Where each aperture 111 is provided, a zip nut of a conventional nature is slip fit over the flange to overlie and underlie the same and provide apertures therein in alignment with the aperture 111 to which it applies.

The diametrically opposite edges of the upper portion 102 of the shell 50 are provided with integral, coextensive, co-planar outwardly directed flanges 112, each having therein a series of apertures 113 which are spaced longitudinally thereof precisely in accordance with the position and spacing of the apertures 111 in the flanges 104. This provides that at the time the upper portion of the shell is placed over the lower portion to complete and form its generally cylindrical configuration the apertures 113 and 111 will be aligned so fasteners may be applied therethrough and through the zip nuts to clamp the upper and lower portions of the shell together, thereby to define the heater housing and the passage 54 as previously described. Prior to the superposition of the upper and lower portions of the shell-like housing 50, the assemblies 70 and 80 are mounted to and in a partially nesting relation to and spaced longitudinally of the lower portion 100. The shield 72 has brackets 73 in connection therewith and projected radially outward therefrom in laterally aligned pairs which are longitudinally spaced. The outer ends of the brackets 73 have right angled dependent extremities giving them a hook-like configuration. The assembly 70 is drop fit to the lower portion 100 of the shell by having the outwardly projected portions of its brackets 73 overlie the flanges 104 at the location of their notches 106 and 108 and their projected extremities depend within and bridge the longitudinally spaced edges of these notches. The assembly 70 is thereby not only positioned in a partially nested relation to the housing portion 100 but restrained from movement in a direction axially and longitudinally thereof.

The strap-like saddle member 84 is a relatively narrow, longitudinally extended, generally rectangular strip of metal, depressed at a central portion of its length to form therein a pocket 114 including side walls 116 which are upwardly and outwardly divergent from its base 118. The side walls are respectively provided with lateral extensions of their upper edges by short co-planar strap portions 120 which have hook-like extremities 122 resembling those of the brackets 73. As will be seen, the saddle 84 may be positioned transversely of the lower half 100 of the housing 50 at the location of the notches 110 and have the hook-like extremities 122 thereof overlie the flanges 104 and drop into the notches 110, the longitudinally spaced edges of which they bridge. The base 118 of the pocket 114 has two apertures which in the mount of the strap are aligned in a direction longitudinally of the housing 50 and centered between and in a plane below and parallel to the plane of the flanges 104. Prior to the application of the strap 104 to the portion 100 of the housing, the apertures in the base 118 of the pocket 114 receive therethrough a pair of longitudinally spaced mounting studs projected from the bottom of the housing of the motor 82. Nuts suitably applied to the motor mounting studs serve to establish a fixed relation of the motor to the strap, centered between its ends which are adapted to be drop fit to the flanges 104. One end of the motor drive shaft is axially extended to mount the fan device 81 in a fixed relation to its projected extremity and for rotation therewith. The opposite end of the motor drive shaft, which positions most adjacent the inlet 56, is axially projected to mount the rotor of the air pump 83 the housing of which is fixedly related to the adjacent end of the motor housing. Since the fan device 81 and the air pump or compressor 83 is of a known and conventional nature, the details thereof need not be further described. Once the assembly of the motor, fan and pump is fixed to the saddle 84, the transformer 85 is fixed to depend from its base 118. On the drop fit of the strap 84 and assembly of elements which mount thereon to the bottom portion of the shell-like housing 50, the dependent extremity of the transformer 85 will be located to dispose within and in spaced relation to the bounding edge of the opening 46 in the bottom of the housing and project, to a limited degree, into the compartment 39.

Mounted in connection with the burner head 93 and projected to a location adjacent the discharge end of the nozzle assembly 94 is a spark plug 124. Mounted in connection with the plate 88 is a flame sensing device 126 which is exposed to the interior of the combustion chamber 76, in a clear view of any flame that may be developed therein on ignition of the air and fuel mixture which is discharged from the nozzle assembly 94 in the operation of the heater.

Attention is directed to the fact that both the air delivery line 97 and the fuel line 98 are directed downwardly from the nozzle, immediately of the innermost end of the combustion chamber assembly to exit from the passage 54 through a pair of apertures in the bottom of the shell 50 directly below the adapters 95 and 96 and thereafter pass, exterior to the shell, into and through an area of the compartment 39. The air delivery line 97 re-enters the passage 54 through an aperture in the bottom of the housing immediately of the strap 84 to connect at its end remote from the adapter 95 to an adapter defining the outlet for air under pressure created in and delivered from the pump 83 in the operation of the heater. A portion of the fuel line 98, remote from the nozzle, within the compartment 39, connects to one end of a fuel filter 128, to the opposite end of which is connected a continuation of the line 98 in the form of a dip tube having means by which it is plug fit in an opening provided in the top of the tank 10 within the compartment 39, immediately adjacent the plate 32 and closely adjacent the inner side of the releasable plate 40. A suitably capped filler opening for the tank 10 is located immediately forward of the outermost side of the plate 32.

One further element applied to the lower portion 100 of the shell 50 prior to the superposition and clamping thereto of the upper portion 102 is a grill element 129 having a circular outer rim 130 formed on a uniform radius complementary to the bounding edge of the inlet opening 56. The rim 130 includes diametrically opposite, co-planar outwardly projected ears 132. In the application of the grill element 129 the lower half thereof positions in the lower portion of the shell 50 to nest within the bounding edge of the inlet opening 56 as the ears 132 seat to diametrically opposite upper surface portions of the flanges 104. The ears 132 are so applied as to nest between the sides of the zip nuts on the flange 104 most adjacent the opening 56 and small segments of the flanges 104 which are projected upwardly and outwardly therefrom.

With the lower portion 100 of the shell-like housing 50 mounted to the saddle provided by the plates 30 and 32 and with the assemblies 70 and 80 fit to the lower portion of the housing as described, together with the grill 129, the upper portion 102 of the housing is then applied. Note that the diametrically opposite co-planar flanges 112 are not only devoid of notches but they have perpendicularly related integral flanges dependent from and coextensive with their remote longitudinally extending side edges. As the portion 102 of the housing is placed over the portion 100, to enclose the previously described assemblies 70 and 80 and grill 129, the flanges 112 are superposed on and abutted to the ribs 107 and 109 projected upwardly from the flanges 104, the overlying end portions of the brackets 73, the zip nuts applied to the flanges 104, the extremities of the strap 84 and the ears 132 of the grill 129. At the same time the dependent outer edge portions of the flanges 112 dispose immediately outward of and in immediately confining adjacent relation to the laterally projected outer edges of the flanges 104. As screws are applied through the aligned apertures 111 and 113 and the zip nuts, flanges 104 and 112 and the parts therebetween, as well as the parts of the shell-like housing are firmly clamped together. In this process the intermediate projected ribs on the flanges 104 insure a seal between the housing parts and between the superposed flanges which inhibit the loss of air passing through the interior and the length of the housing under the influence of the fan device.

As the housing 50 is completed, the fan device 81 has its outer peripheral edge in closely spaced relation to the inner wall surface 51 of the housing 50.

Thus, as the fan 81 rotates, it defines a plenum chamber 136 between it and the adjacent end of the assembly 70 from which there are three outlets. The fan 81 defines the limited inlet to the plenum chamber with the bounding portion of the surface 51. One outlet from the plenum chamber is provided by the inlet 77 to the combustion chamber 76 which is communicated with the plenum chamber by way of openings in the burner head 93. A second outlet from this chamber is provided by the annular passage defined between the peripheral wall 71 of the combustion chamber and the inner wall surface of the shield 72. A third highly restricted and throttled outlet from the plenum chamber is provided by the restricted flow path defined between the shield 72 and the bounding portion of the length of the inner wall surface 51 of the housing 50.

The shoulder 60 formed in the surface 51 is between the ends of the length of the portion thereof bounding the combustion chamber assembly 70 but relatively close to its innermost end. Therefore, a short length of the flow path between the shield 72 and the wall surface 51, at its entrance end, has an annular cross section the radial width of which is relatively larger than that of the cross section of the flow path outwardly of the shoulder 60, in the direction of the discharge opening 58, the latter of which accommodates the flow therethrough of only a very thin layer of air.

As the fan 81 is energized and driven by the motor 82 in operation of the heater, it draws air to the passage 54 through the grill 129 by way of the inlet opening 56. This air is moved by the fan over and around the pump 83, motor 82 and transformer 85, as well as the saddle 84, upstream thereof. This upstream air will be relatively cool and as it flows it will move over the opening 46 to the compartment 39. From the fan 81 the air is driven under pressure to fill the plenum chamber 136 and develop therein a pressure head. An outer peripheral layer of the pressured flow of air produced by operation of the fan will be forced from the plenum chamber into the restricted entrance end of that flow passage defined between the shield 72 and the bounding portion of the surface 51 of the housing 50. Within the entrance end of the flow path or passage between the shield 72 and the surface 51 the outer layer of air directed to and from the plenum chamber will encounter and be restricted by the annular shoulder 60, as a result of which the downstream portion of the flow path between the shield and the surface 51 is even more severely restricted to the discharge end of the shield. Thus, within the annular passage between the shield 72 and the housing and beyond the entrance end to the passage defined thereby, the flow of air through this passage is reduced to a very thin layer thereof and moves at a very high velocity. Due to the thinness of this layer it serves totally to pick up and to withdraw heat from the shield 72 and the combustion chamber which it bounds. As this high velocity thin layered flow reaches the plane of the outer end of the assembly 70, including the point 62, it encounters the short, sharply angled, annular convergent segment 64 of the length of the surface 51 which is immediately of the discharge opening 58. By virtue of its radial limits and its inclination the segment 64 is in an overlying relatively obstructing relation to the flow exiting from between the shield and the surface 51. In fact, the downstream end of the segment 64 positions only slightly outward of and substantially in line with the outermost end of the shield 72 and defines therewith an exit for this high velocity pressured flow from between the outer surface of the shield and the surface 51 the cross sectional area of which is less than that defined between the shield and the surface 51 adjacent the discharge end of the shield. As a result, there is a nozzle-like discharge passage provided for the air passing from between the shield and the housing which produces a deflected highly accelerated movement of the exiting air at and across the outer end of the assembly 70. The restriction and throttling of the flow passing between the shield and the surface 51 produces within the plenum chamber 136 a reflected back pressure and a significant increase in static pressure therein over that which would be provided in a conventional heater. There is found to be, as a result thereof, a substantial increase in and a higher velocity of the flow of air from the plenum chamber into the combustion chamber by way of openings in the burner head and the inlet 77 as well as a higher velocity pressured flow of air between the wall 71 of the combustion chamber and the shield 72. The velocity of the flow of air produced between the wall 71 and the shield results in a rapid drawing of heat of combustion from the wall 71. Most importantly, the significant increase in the velocity of the pressured flow of air to the combustion chamber and the quantity thereof enables that one may increase the flow of fuel to the combustion chamber 76 and oorrespondingly increase the heat producing capability of the heater. Thus, significant improvements in function and efficiency are found in the operation of the heater per the present invention which are not found and have not been exhibited in prior art heaters of the same type.

The composition of the above described air flow pattern produced in a heater such as here illustrated provides that the outermost layer of the air which exits from between the downstream end of the segment 64 of the surface 51 and the heat shield 72 will drive inwardly to the center of the discharge from the combustion chamber assembly immediately of the outer end of the heat shield and engage in a swirling intermingling flow therewith in moving in an acutely inclined path, as a result of which there is a moderating of the temperature of the flow directly at the combustion chamber assembly and in an area thereof immediately of the plate 90, thereby to moderate its temperature also. At the same time the air issuing from the heater under the influence of the outer layer of air and its very high velocity will be caused to have a more uniform and more practical level of temperature. The total blend of the discharge so provided is projected rapidly and substantially outward from the heater and spread quite widely, to a degree to lend the heater a capability of producing a comfortable level of temperature throughout a room area which is greater than one would anticipate for a heater of the size involved. The invention thus provides the heater with an ability to increase and extend the area of its influence and maintain a most satisfactory heating capability. A further benefit is a reduction of the level of carbon monoxide which is normally created in the operation of a heater of the type described.

Neither the particular details of the aspirating type nozzle 94 and the pump 83 and their interaction and function in the projection from the nozzle of atomized fuel, nor the ignition of the fuel-air mixture in the combustion chamber and its combustion and afterburning, are here described since such do not in and of themselves form part of the present invention and are well understood by those versed in the art.

The control and wiring systems for operating the illustrated heater are not only efficiently, compactly and advantageously constructed, arranged and applied but they are of a nature to increase its reliability, level of performance and safety in use. This heater has the essentials of its safety control circuit and safety circuit breaker as well as its motor starting device and the circuit in which it is embodied mounted in connection with a single small circuit board 140 (FIGS. 2, 3, 5, and 8). The board 140 is a small rectangular plate-like section of insulating material mounted by snap fit plastic connector pins 142 in an insulated outwardly spaced relation to the exterior surface of the shell 50. It positions in the compartment 39 at a location adjacent the plate 30 and offset from the opening 46. Mounted to project from and perpendicular to the outermost face 141 of the board 140, along each of two of its side edges at right angles to each other, are blade-shaped terminals. These terminals are in parallel spaced relation along each of the two sides of the board. Also mounted to and projected outwardly of another side edge of the board 140 is a circuit breaker 148 the reset button 152 of which projects outwardly of the compartment 39 through an aperture in the plate 30. For a starting of the heater the button 152 is depressed to close the starting circuit. It will maintain this depressed position until such time the heater fails in its operation or in the event the heater fails to start operating within a predetermined interval of time following the depression of the button 152. In the case of any shut down the starting circuit of the heater can be closed by once again depressing the button 152.

Figure 8:
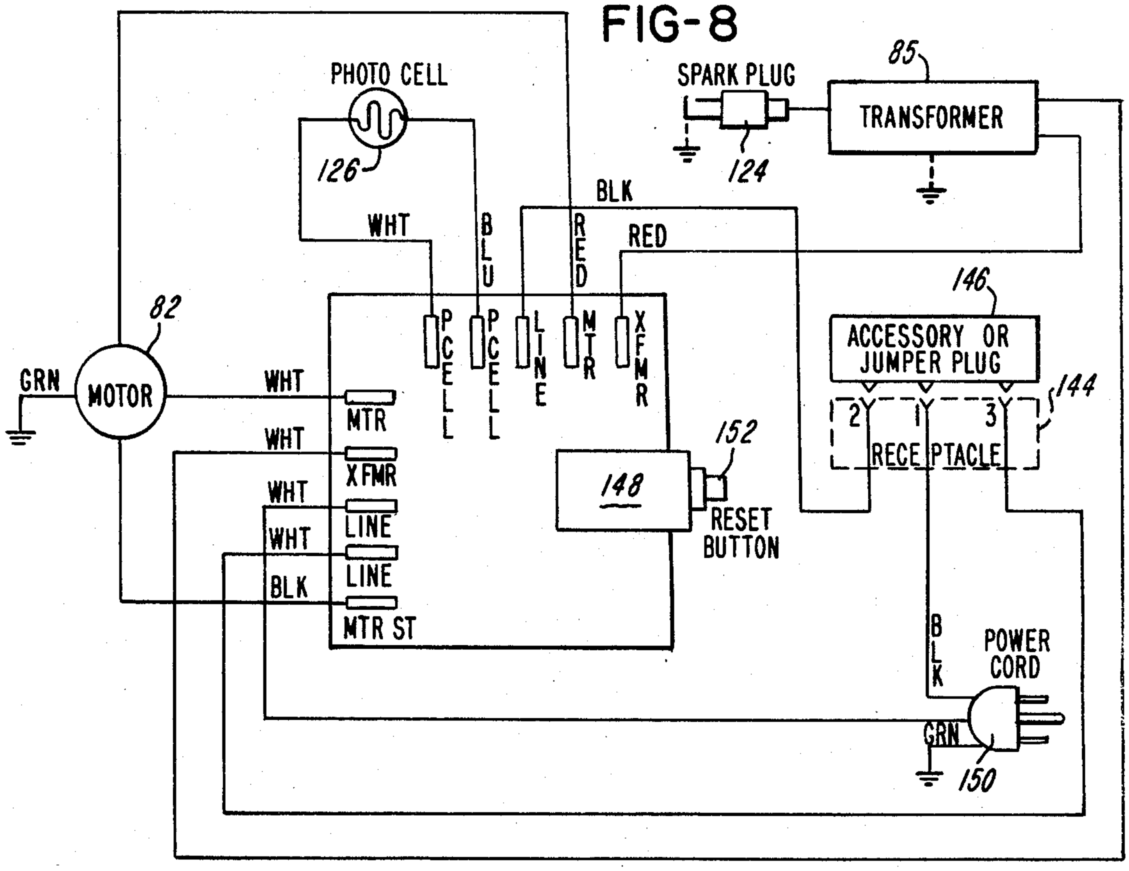
FIG. 8 is a schematic illustrating the wiring diagram provided in connection with the integrated control system of the invention.

FIG. 8 clearly demonstrates the connection of three separate wires between separate terminals on the board 140 and the motor 82; the connection of two wires between the transformer 85 and separate terminals of the circuit board 140; a single wire connection as required between the transformer 85 and the spark plug 124 and the connection of the two wires of a photo cell, constituting the flame sensing device 126, to separate terminals of the board 140. Applied to the face of the board 140 opposite the face 141, to which a portion of each terminal projects, are printed circuits which interconnect terminals as required and embody them in their appropriate circuits and in connection with the necessary control elements to provide for their required function. A starting device which in this case is a positive temperature coefficient resistor rather than a conventional starting relay is incorporated in the motor control circuit.

Extended from and directed into the compartment 39 through another aperture in the plate 30 is a power cord 150 the ground wire of which is connected to a portion of the shell 50 within the compartment 39 and the other two wires of which are respectively, in the one case, directly connected to one of the terminals projected from the face 141 of the board 140 and in the other case connected by a releasable clip to the central one of the three blade-like terminals of a receptacle 144 fixed in and in a bridging relation to an opening in the plate 40. Each of the terminals of the receptacle 144 has respectively connected thereto a wire the opposite end of which is connected to a separate one of the aforementioned terminals projected from the face 141 of the board 140. As may be seen from FIG. 8, one can quickly connect power to or disconnect power from the heater by the application or removal of a jumper plug 146. The plug 146 embodies suitable conductively related male plug portions for friction fit in the mating female clip portions of the receptacle 144 which conductively relate, respectively, with a separate one of the three blade-like terminals of the receptacle 144 to provide the power necessary for the operation of the heater.

The actual circuitry involved, per se, is conventional other than for the use of the positive temperature coefficient resistor in the starting circuit, rather than a conventional starting relay, and the construction and arrangement providing for the application of the plug 146. Note that all components, as seen in FIG. 8, are suitably grounded.

Since the circuitry, other than as indicated, is conventional, they are neither shown nor here described. Their composition will be clear to those versed in the art from the foregoing and the accompanying drawings.

As may be seen, the integrated control and terminal system as here provided minimizes the exposure of those wires which connect the operating components of the heater to their controls. Those wires which are exposed in the passage 54 are few and directed immediately downward from the spark plug, the photo cell device 126 and the motor 82 as well as the transformer 85 to which they apply to minimize their presence in the passage 54. The arrangement is such to minimize the chance of accumulation of dirt and other disadvantageous materials on wires and their connections and to minimize the possibility of any adverse vibration of the wires which might deteriorate their connections and ability to transmit power. An additional benefit of the arrangement is the minimizing of interference with secondary air flow drawn to and directed through the heater by the fan device 81.

As will be clearly evident, the releasable arrangement of the plate 40 and its accessibility at one side of the heater facilitates maintenance and inspection procedures as to the fuel filter, the fuel supply line and the composition of the circuit board 140. In the case illustrated all wires connected t terminals of the board 140 and the receptacle 144 are connected by female friction clips housed in an external cup-like shell of insulating material. A further benefit of the invention control system is that upon removal of the jumper plug 146 one can apply in place thereof a plug which not only can close the motor starting circuit but provide power to any accessory equipment.

As mentioned previously, the air flowing to the passage 54 which moves to and around the motor-pump assembly and the dependent transformer passes over the opening 46 to the compartment 39 to form relatively cool insulating layer protecting the circuit board and its mounted components and terminals as well as the wiring connections. The net effect is the highly beneficial barrier which prevents any chance intense heat of combustion being reflected to and adversely to affect the heater controls, its circuitry and consequently its operation. This protection is enhanced by the secondary air flow pattern developed downstream of the fan 81. With the arrangement provided a restart of the heater may be initiated approximately 30 seconds after the heater shutdown.

Not to be overlooked in the foregoing description is the highly beneficial construction of the shell-type housing 50 of the heater, the unique seal of its parts which avoid the need for intervening gaskets, its relative proportioning as to the separately defined cylindrically configured segments of its length in relation to the length of the combustion chamber assembly and the immediate nature and relative configuration of the discharge end of the heater housing and the contained combustion chamber assembly.

Finally one must consider the uncluttered construction of the heater and the economy of its fabrication for the benefits which it offers.

It should be clear, of course, from the foregoing that the outer peripheral passage for the restricted and throttled air flow as between the heater housing and the heat shield may have the configuration thereof contributed to by modification of the configuration of the shield without departing from the spirit or scope of the present invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A portable space heater comprising a tubular housing open to each of its opposite ends, one end of which provides an inlet opening thereto and the other of which provides a discharge opening therefrom, a combustion chamber assembly in said housing to the end thereof adjacent said discharge opening, heater operating and control systems including an assembly comprising an interconnected motor, fan and transformer, said interconnected motor, fan and transformer being mounted within said housing in a longitudinally spaced relation to said combustion chamber assembly, adjacent the inlet end of said housing, said operating and control systems further including an electrical distribution system for energizing said motor and said transformer, said distribution system including a power supply line and a circuit board through which power is directed from said supply line, said circuit board mounting in connection therewith, and insulated therefrom, control elements for the operation of said heater, said circuit board being located within a protected compartment and mounted to the exterior of said housing by means insulating the same from said housing, there being an opening in the wall portion of said housing adjacent said inlet opening exposing the interior of said compartment to the interior of said housing, said fan being rendered operative upon the supply of electrical power to said motor to draw air inwardly of said housing through said inlet opening, across the opening to said protected compartment, and to move such air in a pressured flow to the combustion chamber of said combustion chamber assembly and about the exterior thereof and between said housing and said combustion chamber assembly, the flow of air generated by said fan being effective to protect said circuit board and said control elements from heat of combustion developed in said combustion chamber assembly.

2. A portable space heater as in claim 1 characterized in that said circuit board provides thereon means affording a starting circuit for said motor and a control for a flame sensing device embodied in connection with said combustion chamber assembly, and said circuitry and the position thereof within said compartment and the interrelation of its components being constructed and arranged to prevent nuisance tripout or shutdown of the heater under a condition which does not so justify.

3. A portable space heater as in claim 2 including a portion of the wall of said compartment being removable to expose the circuit board for inspection, replacement and/or servicing, as needs required.

4. A portable space heater according to claim 3 including a terminal block carried by said removable wall portion, said power supply line being connected to said circuit board through said terminal block and a jumper plug removably mounted in said removable wall portion which when mounted closes a circuit across terminals of said block and which when removed opens said circuit.

5. A portable space heater comprising a housing constructed for a flow of air therethrough from an entry end to a discharge end, means defining a combustion chamber in said housing, heater operating elements including energizable means for compelling a flow of air through said housing and electrical controls for said operating means, means defining a protected compartment external to said housing and said housing having an opening in an area adjacent to said entry end thereof communicating the interiors of said housing and said compartment and said electrical controls including circuit board means in said compartment embodying in connection therewith the essential wiring and connections for directing power to and controlling the operation of said operating elements, the construction and arrangement utilizing the relatively remote location of the circuit board means and the cooling effect of incoming air at the entry end of said housing to insulate said circuit board means from the heat of combustion generated in said combustion chamber.

6. Apparatus according to claim 5 wherein said electrical controls include a starting circuit and a positive temperature coefficient resistor therein kept sufficiently cool as a part of said circuit board means so as to facilitate restart of a heater following shutdown thereof.

7. Apparatus according to claim 6 characterized by a re-start control mounted to and forming a part of the circuit board means, said re-start control including a reset button extending through an aperture in a compartment wall to be accessible for operation from outside the compartment.

8. A portable space heater comprising a tubular shell defining a housing the ends of which are open to respectively provide an inlet opening at one end and a discharge opening at the opposite end, means for generating a flow of air through said housing, from said inlet opening to and through said discharge opening, a combustion chamber assembly within said housing spaced longitudinally from said air flow generating means, in the direction of said discharge opening, a portion of said housing forming a restricted annular passage open to the space between said assembly and said air flow generating means, said annular passage being formed to produce a throttled high velocity movement therethrough of a thin layer of the air flow produced by said generating means, an integrated control system for the operating components of said heater embodying terminals mounted in an insulated outwardly spaced relation to an exterior surface portion of said housing adjacent its inlet opening, said housing having an aperture therein opening to its interior adjacent said integrated control system, means forming with the exterior surface of said housing an enclosure for sheltering said control system an opening to which is provided by said aperture and said generating means being constructed and arranged to cause the flow of air generated thereby to produce in a movement thereof across said aperture an insulation of said control system from exposure to the heat of combustion produced on ignition and burning of fuel in said combustion chamber.

9. Apparatus as in claim 8 wherein the wiring essential to completion of the circuitry of said heater is directed from its operating components directly through openings in the wall of said heater relatively adjacent thereto and into said enclosure wherein they are connected to appropriate of said terminals to minimize the exposure thereof to the flow of air produced by said generating means to leave the space between said generating means and said assembly relatively uncluttered.

10. Apparatus as in claim 9 wherein said air flow generating means includes a drive motor forming part of said operating components of said heater having a starting circuit including a starting device in the nature of a positive temperature coefficient resistor forming part of said integrated control system housed in said enclosure the insulation of which maintains said positive temperature coefficient resistor in a condition facilitating re-start of the operation of said motor and the heater of which it forms a part after a shutdown of their operation.

11. Apparatus as in claim 10 wherein the limited exposure of the wiring and the limitation of the length thereof within said heater inhibits adverse vibration or contamination of the wiring on the production of a flow of air through said housing by said generating means.

12. Apparatus as in claim 11 wherein means forming parts of said enclosure provides a saddle mounting said housing on a fuel tank.

13. Apparatus as in claim 12 wherein a fuel line, including a filter is directed through said enclosure for delivery of fuel to said combustion chamber and the filter is located within said enclosure and one side portion of said enclosure is releasable to provide quick and complete access to said integral control system and the components thereof and said filter and the portion of the fuel line within said enclosure.

* * * * *

UNITED STATES PATENT OFFICE
CERTIFICATE OF CORRECTION

Patent No. 4,443,187 Dated April 17, 1984

Inventor(s) Robert S. Shaftner; Norman D. Chambers; Michael A. Kagan; and Eugene C. Briggs It is certified that error appears in the above-identified patent and that said Letters Patent are hereby corrected as shown below:

Col. 3, line 66, "a" (first occurrence) is corrected to read -- an --.

Col. 4, line 3, "th" is corrected to read -- the --.

Col. 13, line 4, "t" is corrected to read -- to --.

Signed and Sealed this

*Eighteenth* Day of *December 1984*

[SEAL]

*Attest:*

GERALD J. MOSSINGHOFF

*Attesting Officer* *Commissioner of Patents and Trademarks*